Nov. 29, 1960  H. S. McNABB, JR., ET AL  2,962,591
METHOD FOR ANALYZING THE STRUCTURE OF SOLID OBJECTS
Filed Feb. 8, 1956  2 Sheets-Sheet 1
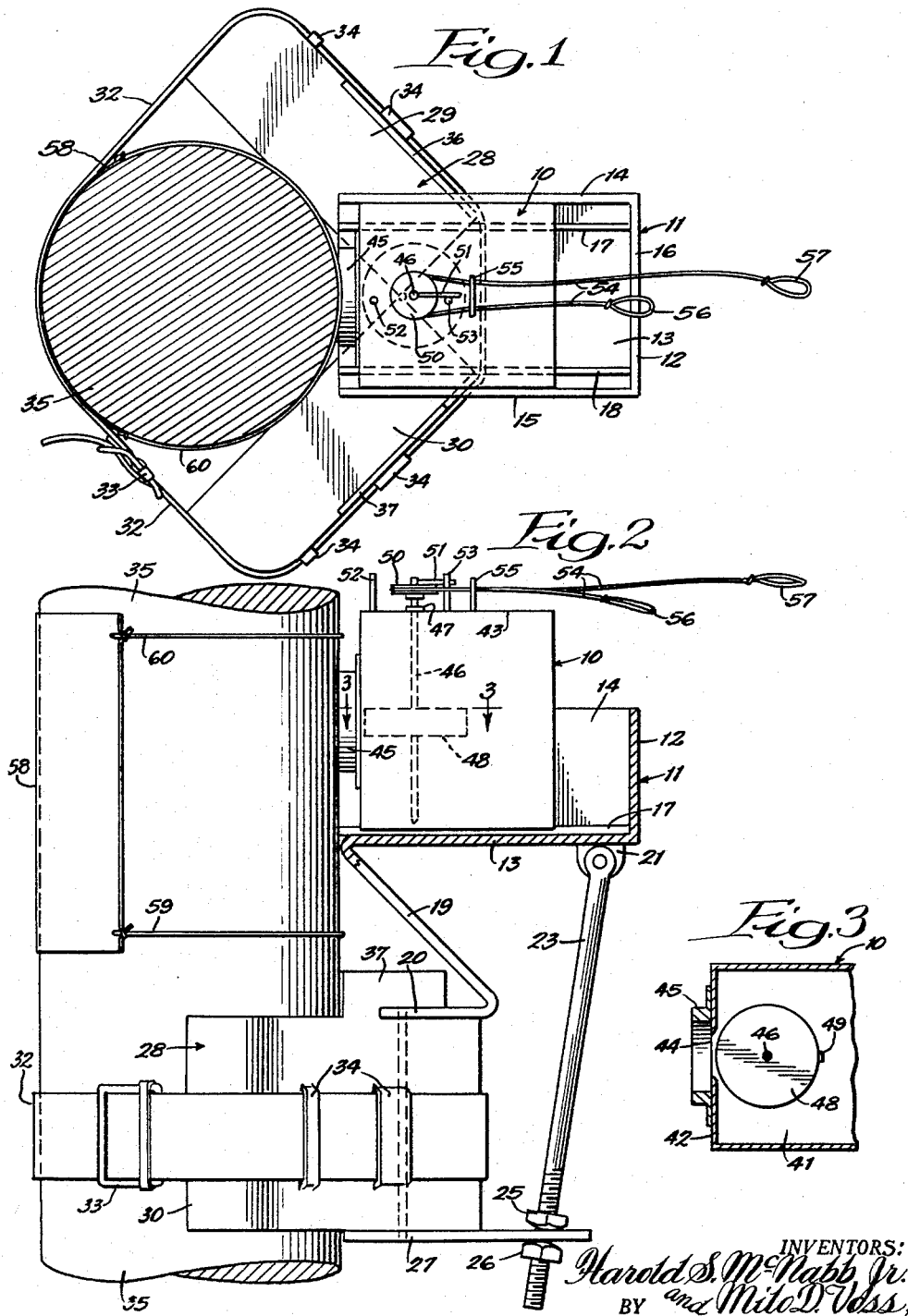
INVENTORS:
Harold S. McNabb Jr.
BY and Mito D. Voss
Dawson, Tilton & Graham
ATTORNEYS Nov. 29, 1960 H. S. McNABB, JR., ET AL 2,962,591
METHOD FOR ANALYZING THE STRUCTURE OF SOLID OBJECTS
Filed Feb. 8, 1956 2 Sheets-Sheet 2
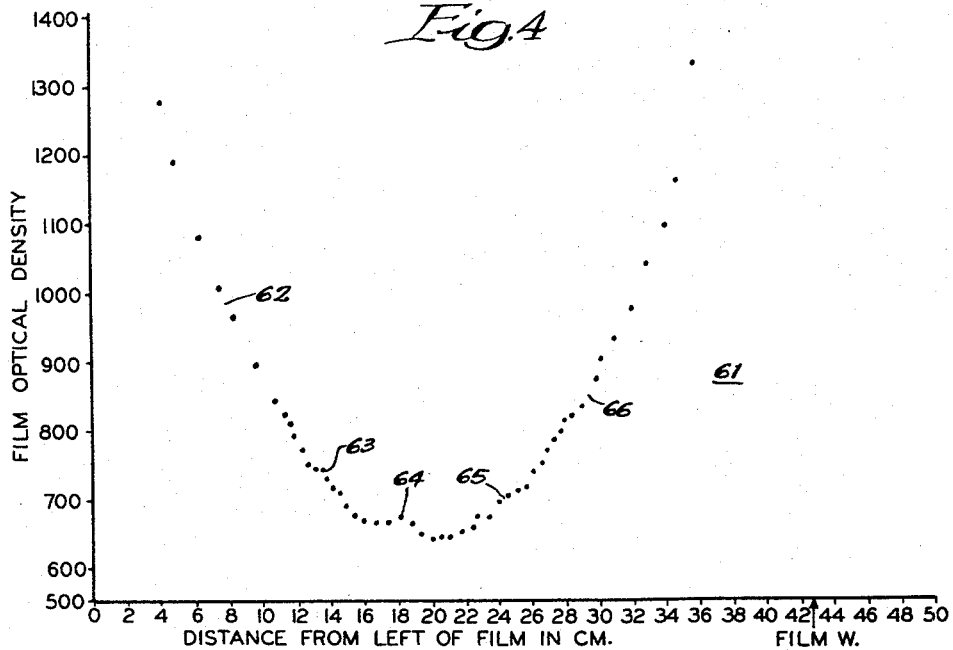
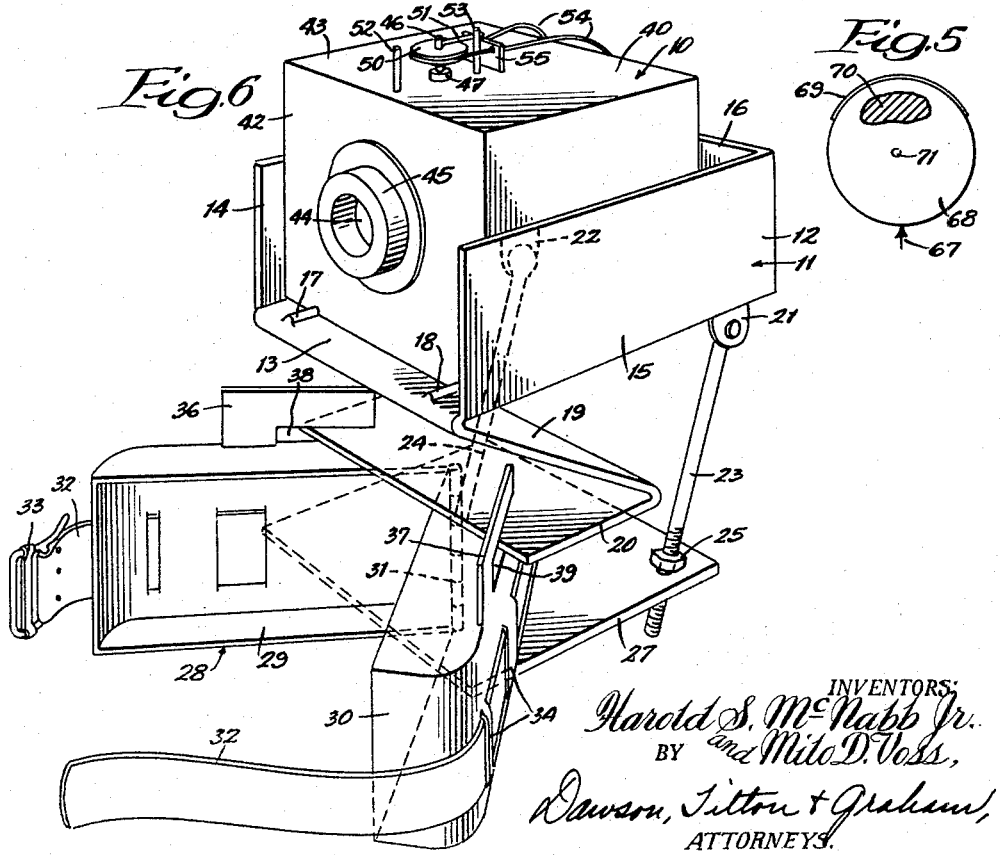
INVENTORS:
Harold S. McNabb Jr.
and Milo D. Voss
BY
Dawson, Tilton & Graham
ATTORNEYS United States Patent Office 2,962,591
Patented Nov. 29, 1960

2,962,591
METHOD FOR ANALYZING THE STRUCTURE OF SOLID OBJECTS

Harold S. McNabb, Jr., and Milo D. Voss, Ames, Iowa, assignors to Iowa State College Research Foundation, Inc., Ames, Iowa, a corporation of Iowa Filed Feb. 8, 1956, Ser. No. 564,147

3 Claims. (Cl. 250—83)

This invention relates to a method and apparatus for analyzing the structure of solid objects, and more particularly to a method and apparatus employing radioactive isotopes in locating deviations from normal in the structure of a solid object. The invention has an exemplary utility in determining whether cylindrical wooden objects (such as growing trees, telephone poles, etc.) have internal defects and if so, to locate the defective areas thereof.

There is a need in the study of growing trees for analyzing the internal structure thereof to determine the presence and location of defects therein as, for example, holes or cavities, areas that are rotted, areas having excessive moisture accumulations, etc. The same need exists for inspecting wood objects such as telephone poles in order to predict and determine the necessity of replacement thereof that may be required because of areas of rot that developed therein, because of the presence of holes or passages formed interiorly thereof and often because of areas that are eaten away by various insects, all of these defects frequently being indiscernible from an inspection of the outer surfaces of the pole.

Two general techniques have been developed for locating such defects, one of which may be denominated a destructive technique, and the other indestructive. The former causes permanent damage to the growing tree or other wooden object in that it is necessary to bore a passage into the interior thereof and take a sample of the cellular structure therein. To a large extent, this is an extremely inaccurate procedure for there is no assurance that a defective area which may exist will be encountered by the passage bored into the tree or pole. Further, a sample of the internal structure of a wooden object taken at any point therealong will not be indicative of the structural character of the remainder of the object. Therefore, where possible, such destructive techniques are not employed.

A development that enables workers to analyze the structure of a tree or other wooden object by an indestructive technique involves the use of X-ray apparatus. In this procedure, X-ray equipment, which may be mobile in the sense that it can be mounted on the bed of a truck or other vehicle, is moved into position adjacent the object to be analyzed, and X-rays are projected through the object from one side thereof and are received on a film plate positioned on the opposite side thereof. With this technique, it has always been thought necessary to project the X-rays along parallel paths, and where cylindrical objects are being analyzed, to artificially increase the thickness thereof along the curvatures so that all of the parallel rays pass through a body of uniform thickness (that is, the wooden object alone or portions of the wooden object in combination with the material employed to increase the thickness thereof). The purpose of this is to provide a relatively uniform object density in front of the entire film plate so that each of the parallel rays passes through material thicknesses of substantially identical densities. One of the commonly used materials to compensate for the curvature of a cylindrical tree or telephone pole is rubber, in the form of tubing or wedges.

The film plate after exposure is then read visually, and the mount of annular growth ring definition of the tree appearing on the film plate is used as the measure of defective or abnormal conditions within the object. Generally, where such ring definition decreased in any area, that area was believed to have some defect in the structure thereof.

This X-ray technique has a number of serious disadvantages that have prevented its use except on what may be considered an experimental basis. First of all, the defect determinations are quite unreliable for they are based on ring definition (that is, the annular rings of a tree that designate the growth seasons) which is not always related to defects, and which at best provides only a general indication that a defect may be present when the definition is less than that which should normally appear. Secondly, the necessity for projecting the X-rays along parallel paths has imposed a limitation on the use of such techniques for it requires that the X-ray source be spaced a substantial distance from the cylindrical object. Usually, the greater the diameter of the object, the greater must be the spacing of the X-ray source therefrom. This has necessitated the need for a very powerful X-ray source which means that the equipment must be large, heavy and expensive, particularly because the more powerful the source, the greater must be the size and weight of the shielding used in conjunction therewith, which therefore sharply restricts the use of the equipment to the testing and analyzing of objects such as telephone poles where the surrounding areas are fairly clear, and for the most part makes its use impossible in the testing of growing trees. Another shortcoming is that the film plates were read visually, which often introduced human error in interpreting the film plates.

An object of this invention is to provide an improved and far superior technique for analyzing the internal structure of solids, such as cylindrical trees and poles, etc. Another object is in providing a technique comprising both an apparatus and method for locating defects in objects such as cylindrical trees that affords exceptional accuracy both in determining if defects are present and if so, in locating the same. Still another object is in providing apparatus that is simple, inexpensive and is light-weight, whereby it is truly portable in contrast to apparatus used with the X-ray techniques described hereinbefore which were not portable, and at best were only transportable or mobile in the sense that it could be mounted on the beds of vehicles.

Still another object is that of providing apparatus and a method for analyzing cylindrical wooden objects to locate defects therein, that employs high frequency rays (X-rays in particular) and that is based on the discovery that the rays penetrating the object under test do not need to pass therethrough in parallel planes, but rather, may be projected through the object in a radiating pattern. A further object is in the presentation of a technique employing X-rays for locating defects in cylindrical objects that does not require the use of wedges or other material of comparable density to that of the test object, to provide a uniform thickness through which the radiating rays must project. Still a further object is in the development of a technique wherein defects in objects are determined by the optical density differences on a film that is exposed to X-rays radiating through the test object.

Yet a further object is to provide apparatus comprising a radioactive isotope such as Thulium[170] that is light-weight and portable, that can be strapped or otherwise secured to a tree or other cylindrical object, and that is effective to project rays through the tree in a radiating pattern that impinge upon a film secured to the object opposite the source of radiations, and that follows the contour of that object, the mounting of the apparatus on the object preventing relative movement therebetween as, for example, the almost imperceptible swaying of a tree which is sufficient to distort the indicia of the film.

Yet another object is the provision of a method for testing a cylindrical tree to locate defective areas therein that involves the steps of passing X-rays through the object in a radiating pattern from a source adjacent the surface of the object, exposing a film to the rays that have passed through the object, and thereafter reading the film either visually and/or by a densitometer to determine optical density deviations from normal—deviations that show an increased optical density reflecting a decrease in density in the object under test, and vice versa. Additional objects and advantages will appear from the following specification.

An embodiment of the invention is illustrated in the accompanying drawings, in which—

Figure 1 is a top plan view of apparatus incorporating the invention, shown in its position in relation to a cylindrical object; Figure 2 is a vertical sectional view of the apparatus as shown in Figure 1; Figure 3 is a broken horizontal sectional view taken along the line 3—3 of Figure 2; Figure 4 is a graph of the optical density of an actual film made during a use of the apparatus; Figure 5 is a schematic showing of the cylindrical wooden object that was tested and that is represented by the graph of Figure 4; and Figure 6 is a perspective view of the apparatus.

Reference will first be made to Figure 6 in describing the apparatus, since that figure most clearly shows substantially all of the components in their relation with respect to each other. The apparatus comprises generally a radiation component which is designated with the numeral 10, and a support assembly therefor which is designated with the numeral 11. The support arrangement illustrated and which will be described in detail should be considered exemplary only for other arrangements may be used which will permit the radiation assembly to be brought into contiguous relation with the surface of an object to be tested, and which will so secure the assembly thereto that relative movement therebetween is prevented.

The support structure comprises a holder 12 having a platform 13, side walls 14 and 15 extending upwardly therefrom, and a rear wall 16. Preferably, platform 13 is provided with spaced apart ribs 17 and 18 that provide a track for stabilizing the component 10 in a manner to be described hereinafter. Extending downwardly and rearwardly from the platform 13 at the forward open end of the holder 12 is a leg 19 that at its lower end is turned forwardly to form a tongue 20. Adjacent the rear end of the platform 13 are depending ears 21 and 22 along the respective sides thereof, that pivotally receive the depending struts 23 and 24, respectively. The struts at their lower ends are threaded to receive, as is shown best in Figure 2, lock nuts 25 and 26 which locate the position of a base plate 27 with respect to the struts. It is apparent that the struts pass through openings provided in he base plate 27, and that the lock nuts 25 may be brought into engagement with the upper surface of the base plate and the nuts 26 into engagement with the lower surface thereof.

A clamp 28 is provided with hinge sections 29 and 30, pivotally secured together at one end by a hinge 31, which are adapted to be drawn tightly about an object to be tested by web belt 32 having at one end a conventional clamp 33. The belt 32 is threaded through loops 34 provided by each of the hinge sections to locate and secure it in position with respect to those sections. While the clamp 28 is not cylindrical, it is apparent (as shown in Figure 2) that it conforms generally to the shape of a cylindrical object 35 when drawn into engagement therewith by the belt 32 which extends about the cylindrical object.

Formed integrally with the hinge sections 29 and 30 are L-shaped brackets 36 and 37, the horizontal leg of each being spaced above the hinge section to define, respectively, slots or channels 38 and 39 that slidably receive the tongue 20 therein, as shown both in Figures 6 and 2.

The radiation component 10 comprises a shield which, in the form shown, is a cubicle box 40 having side walls, end walls, and a top and bottom wall defining a complete enclosure and defining, as well, a compartment 41 (Figure 3). Since the front wall and top wall of the shield will be referred to in the following description, they are designated with the numerals 42 and 43, respectively. The box 40 is preferably made of lead so as to afford a shielding or protection for the persons using the apparatus, and may be cylindrical as well as cubical.

As is seen most clearly in Figures 3 and 6, the forward wall 42 of the shield is provided with an opening 44 therein, and if desired, a bronze cap 45 may be mounted on the front wall so as to extend outwardly from the opening 44 thereof. Mounted for rotation within the compartment 41 is a shaft 46 that extends vertically between the top and bottom walls of the shield box and in alignment with the opening 44. The shaft extends outwardly through the top of the box and through a boss or bearing 47 provided therefor. Intermediate the ends of the shaft 46, and in alignment with the opening 44, is a support 48 that in the form shown is a wheel or disc. The support disc 48 is preferably formed of lead so as to provide a shielding of the X-rays that emanate from the source 49 secured to the wheel along one side thereof.

The source 49 is a radioactive isotope, and is a radiated Thulium pellet of radioactive Thulium$^{170}$ which produces a radiation effect comparable to that of an equivalent 100 Kva. X-ray machine.

The end portion of the shaft 46 which extends above the top wall of the shield and above the bearing 47, has a pulley wheel or sheave 50 secured thereto, and extending outwardly beyond the circumference of the pulley 50 and similarly fixed to the shaft is a finger 51 adapted to be brought into abutment selectively with the stop posts 52 and 53 that are rigidly secured to the top wall 43 of the shield and extend upwardly therefrom. The stop posts 52 and 53 are aligned with each other and are offset slightly from the shaft 46, as is seen most clearly in Figure 1. Entrained about the pulley 50 is a draw cord 54 that passes through apertures provided therefor in a guide plate 55. If desired, the ends of the cord 54 may be formed with finger loops 56 and 57. It will be clear that when the cord 54 is drawn, the pulley wheel 50 will rotate, thereby rotating the support disc 48 so as to shift the pellet 49 from the position shown in Figure 3 through 180° to bring it into a centered relation with respect to the opening 44, and vice versa. In this rotational movement, the finger 51 engages the stop posts 52 and 53—the former to align the pellet in front of the opening or window 44, and the second to align it as shown in Figure 3 so that it is separated from the opening by the entire diameter of the support disc 48.

The bottom wall of the shield box 40 is provided with channels therein that are alignable with the ribs 17 and 18 so as to stabilize the box laterally on the support platform 13, while permitting the same to be shifted longitudinally with respect to the ribs. Thus, after the support assembly 11 is secured in position with respect to a cylindrical object 35 to be tested, as is shown both in Figures 1 and 2, the radiation component 10 can be shifted forwardly to bring the cap 45 into abutting engagement with the cylindrical wall of the object.

A flexible film designated with the numeral 58 is drawn about the object 35 and is secured in position thereon by bands 59 and 60 that are preferably elastic, that are secured to the wrapper for the film 58 by eyelets provided for that purpose, and that themselves are drawn about the cylindrical object. It will be appreciated that the film per se will be enclosed in a flexible, light-proof film wrapper or holder which is referred to frequently in the art as a cassette. The film may be conventional commercial film such as a 7" x 17" safety-type Kodak X-ray film. Other means may be employed to secure the film and its wrapper to the object 35, but whatever means are employed should be such that relative movement between these two members is prevented.

In use of the apparatus, and in carrying out the method or technique developed for testing cylindrical wooden objects in an effort to determine whether defects are present in the structure of such objects and if so, to locate such defects—the support assembly 11 is secured to the object at any position therealong, as is seen in Figures 1 and 2. The X-ray sensitive film is secured to the object in a manner heretofore described, and the shield box 40 is advanced toward the object 35 to bring the cap 45 into abutting engagement therewith. It will be appreciated that the film strip should be positioned opposite the opening 44 of the shield box, and preferably so that the center of the film strip is in alignment with the center of the opening. Thereafter, one end of the draw cord 54 is pulled so as to rotate the support disc 48 to bring the stop finger 51 into engagement with the post 52 which thereby aligns the source of X-ray energy 49 with the center of the opening 44. Exposure of the film strip is thereby initiated.

X-rays radiating outwardly from the source 49 pass through the object 35 along radial lines from the source and expose the film 58. The exposure is continued for a time depending upon the diameter of the object 35, and the exposure time depends on the strength of the source (measured in curies), the absorption coefficient of the material traversed, and on the energy of the radiation, which in the case of Thulium$^{170}$ is fixed. After the exposure period is terminated, the opposite end of the cord 54 is drawn to return the energy source 49 to a position within the compartment 41 such that the shielding support disc 48 separates it from the opening 44. The film strip is then removed and will be developed by standard procedures which are well known. The apparatus may be shifted to other locations along the object 35 if a number of separate tests are to be made.

The developed film strip can be read visually, for the indicia employed in determining whether defects are present in the object 35 is the optical density difference from normal which may be recognized by visual inspection of the film strip. However, a more accurate determination of density differences is made if the film strip is exposed to a densitometer which is far more sensitive to changes in optical density than the human eye. Further, the use of a densitometer minimizes to a considerable extent interpretational errors that may be made when the film strip is visually read. Densitometers are well known in the art, and their use being familiar, a description of such a device appears to be unnecessary.

The optical density of the film strip may be plotted against distance on a graph such as that shown in Figure 4, and which is designated with the numeral 61. In this graph, the $y$ axis represents the film optical density, and is divided into numerical increments of 100. The $x$ axis represents distance, and specifically the length of the flexible film employed in a particular test, the length being divided into centimeters. The density of the film from end to end thereof may be plotted to form a curve designated by the numeral 62. Deviations from the norm of this curve represent a greater optical density (a lesser object density) when the deviation extends above the path of the curve. In a corresponding manner, deviations that project below the norm of the curve represent a lesser film optical density (a greater object density). In the graph 61, a number of deviations extending above the curve are shown, and these deviations are designated with the numerals 63, 64 and 65, while the single deviation that extends outwardly from the curve is designated with the numeral 66.

It will be apparent that the curve plotted from the optical film density is not a straight line, for the film optical density is opposite to that of the density of the object through which the rays must pass in reaching the film. Therefore, if reference is made to Fig. 5, which depicts an actual wooden log that was tested and thereafter sectioned to verify the test results, and of which the graph of Figure 4 is representative, it will be appreciated that the X-rays radiating from the source (which, in Figure 5, is designated with the numeral 67) pass through less of the object 68 in reaching the lateral edges of the film 69 than in reaching the center portion of the film. As a result, the object 68 insofar as regards the penetration of the rays from the source 67 has lesser density toward the lateral edges of the film 69 and greater density toward the center of that film. Since the film optical density is inversely proportional to the object density, it will be apparent that a plotting of the film density against the length of the film will result in a curve of the character shown in Figure 4.

The test object 68 when sectioned to verify the test results, was found to have a relatively wide defective area designated with the numeral 70, and a smaller defective area 71. It will be noted in comparing Figures 4 and 5 that the deviations 63, 64 and 65 tend to run together and are located substantially between the 12 centimeter mark and 26 centimeter mark on the graph. This corresponds substantially to the width of the actual defective area 70. The defective area 71 is shown by the large deviation 64 on the graph, and since it is in line with the source 67 and defective portion 70, it appears as a larger deviation within the deviations 63 and 65.

Repeated tests have been made using apparatus of the character described and the method steps set forth, and the results of these tests verified by sectioning the test object and visually inspecting the same. As brought out before, graph 61 (shown in Figure 4) and the object 68 (shown in Figure 5) represent an actual test that was made. In this specific test, a silver maple log having a six inch diameter was tested by exposing the same to a Thulium source in an arrangement such as that shown in Figures 1 and 2. The radiation of the test log was continued for a period sufficient to provide optical densities on the film strip that could be read both visually and by means of a densitometer. The densitometer readings were plotted so as to form the graph shown in Figure 4. The test log was then sectioned and it was observed visually that it had defective areas corresponding to deviations from normal in the plotted curve. The defective areas appear as shown in Figure 5, and are seen to correspond to the curve.

Other specific examples are as follows: A silver maple log having a diameter of seven inches was prepared by boring four holes in it—two having a diameter of one inch, another a diameter of one-half inch, and the fourth a diameter of three-sixteenths of an inch. Each of the holes was bored in the log at right angles to the longitudinal axis thereof. One of the 1" holes was filled with shavings of soft maple, and the test log was then tested using the Thulium X-ray apparatus described. The resulting test film was read both visually and by means of a densitometer, and each of the holes appeared on the film as an area of greater optical density. The hole which was filled with soft maple provided a film optical density slightly less than the densities for the unfilled holes.

A silver maple log having a nine inch diameter was prepared for testing by boring two 1" diameter holes therein parallel to the longitudinal axis of the log. The log was tested several different times by using the X-ray apparatus and techniques described; and in each test, the holes were given a different treatment. In one test, the holes were filled with decayed wood, and in another, they were filled with wood shavings; a third time, they were filled with water; while in another test, they were left empty. In each test, the defects were observed on the developed film by both visual inspection and through the use of a densitometer as corresponding areas of greater optical density. When the densities were plotted to form a graph of the character shown in Figure 4, it was found that the deviations from normal were located at distances corresponding to the location of the defects in the test log. It should be noted that in the test wherein the holes were filled with water, the defective areas (that is, the deviation in film optical densities) were somewhat difficult to detect by visual reading of the film, but were located by using a densitometer.

In testing a tree of other structure, ordinarily a number of separate films will be exposed, and the Thulium source will be located at different circumferential positions thereabout. In this manner, a "cross firing" procedure is effectuated whereby their is assurance that no areas of abnormality are overlooked.

While in the foregoing specification an embodiment of the invention has been described in detail both with respect to the structural features thereof as well as the method steps involved, it will be appreciated that numerous changes may be made in those details by those skilled in the art without departing from the spirit and principles of the invention.

We claim:

1. In a method of locating defects in the structure of approximately cylindrical wooden objects such as a tree, a telephone pole, and the like, the steps of positioning a source of radioactive energy adjacent the surface of a test object, passing the radioactive radiation therethrough in a radial pattern, exposing a film to the radiations that have passed through said object to record the same thereon, reading said film with a densitometer to ascertain the optical densities of the exposed film at various positions therealong, plotting the said optical densities as a function of the length of the film, ascertaining deviations from the norm of the curve, and orienting said deviations with respect to the test object to locate density variations within the internal structure of the test object.

2. The method of claim 1, in which the source of radioactive energy is Thulium$^{170}$.

3. The method of claim 1, in which the source of radiation is positioned at a plurality of circumferential positions about the object.

References Cited in the file of this patent

UNITED STATES PATENTS

| | | |
|---|---|---|
| 2,607,012 | Siebert | Aug. 12, 1952 |
| 2,622,209 | Hjulian et al. | Dec. 16, 1952 |
| 2,719,926 | Proctor et al. | Oct. 4, 1955 |

OTHER REFERENCES

Industrial Inspection with Reactor Isotopes, a paper by Clarke, presented to Geneva Conference, August 1955, vol. 15, pages 188 to 193, of Peaceful Uses of Atomic Energy, published by United Nations, New York, in 1956.